US010552844B2

(12) United States Patent
DeCelles et al.

(10) Patent No.: US 10,552,844 B2
(45) Date of Patent: Feb. 4, 2020

(54) SMART BOX FOR INITIATING AN IN-HOME CUSTOMER SERVICE EXPERIENCE

(71) Applicant: HearNow Technologies, Inc., San Diego, CA (US)

(72) Inventors: Matthew DeCelles, San Diego, CA (US); Steven Dempsey, Napa, CA (US); Patrick Eckstein, San Diego, CA (US)

(*) Notice: Subject to any disclaimer, the term of this patent is extended or adjusted under 35 U.S.C. 154(b) by 693 days.

(21) Appl. No.: 14/690,332

(22) Filed: Apr. 17, 2015

(65) Prior Publication Data

US 2015/0302417 A1    Oct. 22, 2015

Related U.S. Application Data

(60) Provisional application No. 61/981,159, filed on Apr. 17, 2014.

(51) Int. Cl.
*G06Q 30/00* (2012.01)
*H04W 4/12* (2009.01)

(52) U.S. Cl.
CPC ............ *G06Q 30/016* (2013.01); *H04W 4/12* (2013.01)

(58) Field of Classification Search
CPC ............................ G06Q 30/016; H04W 4/008
USPC .......................................................... 705/28
See application file for complete search history.

(56) References Cited

U.S. PATENT DOCUMENTS

| 8,667,072 B1* | 3/2014 | Cordell | H04L 67/26 709/206 |
|---|---|---|---|
| 9,420,103 B1* | 8/2016 | Varman | H04W 4/12 |
| 2009/0282125 A1 | 11/2009 | Jeide et al. | |
| 2012/0112902 A1* | 5/2012 | Meyers | G08B 13/1436 340/539.1 |
| 2014/0236726 A1* | 8/2014 | Acosta | G06Q 30/0261 705/14.58 |
| 2015/0117661 A1* | 4/2015 | Kulavik | H04R 1/1041 381/74 |
| 2015/0302416 A1 | 10/2015 | DeCelles et al. | |

* cited by examiner

*Primary Examiner* — Florian M Zeender
*Assistant Examiner* — Joseph M Mutschler
(74) *Attorney, Agent, or Firm* — Mintz Levin Cohn Ferris Glovsky and Popeo, P.C.

(57) ABSTRACT

The subject matter disclosed herein provides methods for providing a personalized customer service experience using a customer service application. A sensor associated with a container configured to house one or more devices can determine whether the container has been opened. A processor can access a profile associated with the container and the devices that includes at least a first value uniquely identifying the container. The processor can activate a communication module to send a first message via a communication network to a backend system. The first message can include some of the accessed profile. The first message can prompt the backend system to search for a customer record using the first value and to send a second message to a mobile device that prompts execution of an application on the mobile device. Related apparatus, systems, techniques, and articles are also described.

19 Claims, 7 Drawing Sheets

FIG. 2
FIG. 3

SMART BOX FOR INITIATING AN IN-HOME CUSTOMER SERVICE EXPERIENCE

CROSS REFERENCE TO RELATED APPLICATION

This application claims priority under 35 U.S.C. § 119(e) to U.S. Provisional Patent Application No. 61/981,159, filed on Apr. 17, 2014, titled "Smart Box For Initiating An In-Home Customer Service Experience", the disclosure of which is herein incorporated by reference in its entirety.

TECHNICAL FIELD

This disclosure relates generally to customer service support systems and information networks and, in particular, to providing a personalized customer service experience using a customer service application without requiring the customer to seek assistance at a retail store.

BACKGROUND

Customer service is the provision of support to customers. This support helps customers make cost effective purchases and learn how to correctly use a product. Traditionally, these services are provided in-person at brick and mortar retail stores by store employees. With the explosion in online shopping, however, the prevalence of in-store purchases and in-person customer support has decreased as most online purchases are delivered directly to a customer's home. The shift from in-store interactions to home based transactions, however, does not eliminate the need for high quality customer service. Alternative techniques for providing customer service are needed as it may be impractical to require a customer to travel to a retail store to receive in-person support.

SUMMARY

Methods and apparatus, including computer program products, are provided for providing a personalized customer service experience using a customer service application without requiring a customer to travel to a physical location to receive in-person support.

In one aspect, a sensor associated with a container configured to house one or more devices is used to determine whether the container housing the one or more devices has been opened. Based on determining that the container has been opened, a profile associated with the container and the one or more devices is accessed by a processor connected with the sensor. The profile includes at least a first value uniquely identifying the container. Based on determining that the container has been opened, a communication module is activated by the processor to send a first message via a communication network to a backend system. The first message includes at least some of the accessed profile. The backend system comprises at least one backend processor and is associated with a customer relationship management system. The first message prompts the backend system to search for a customer record using the first value and to send a second message to a mobile device associated with the customer record. The second message prompts execution of an application on the mobile device. The application is configured to provide a customer service interaction session with the customer relationship management system associated with the backend system.

The above methods, apparatus, and computer program products may, in some implementations, further include one or more of the following features.

The communication module can send the first message to the backend system using one or more of a wireless connection and a wired connection.

The wireless connection can be one or more of a WiFi connection, a global WiFi connection, a radio frequency connection, a connection via a SIGFOX network, a connection via a satellite network, a cellular connection, and a Bluetooth connection.

The second message can be one or more of a text message, a voice call, an e-mail, and a notification.

The profile can further include a second value. The second value can be associated with one or more identifiers that uniquely identify each of the one or more devices.

The application can be configured to provide live support with a customer service representative.

The application can be configured to provide access to self-help material.

The self-help material can include one or more of an instruction manual associated with the one or more devices, a tutorial associated with the one or more devices, a discussion board associated with the one or more devices, a return address associated with the one or more devices, and warranty information associated with the one or more devices.

The application can be configured to provide access to information describing one or more related products used with the one or more devices.

The determining can further include receiving a signal from the sensor in the container, the signal indicating that the container has been opened.

The sensor can be one or more of an ambient light sensor and a motion sensor.

The profile can further include an address for returning the container. The application can be configured to cause the mobile device to display a third message. The third message can include a reminder to return the container to the address.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 2 illustrates a profile in accordance with some example implementations;

FIG. 3 illustrates a notification in accordance with some example implementations;

Like reference symbols in the various drawings indicate like elements.

DETAILED DESCRIPTION

Implementations of the disclosed subject matter provide techniques for initiating a personalized customer service experience via a communications network. These techniques can be used in a variety of contexts involving the delivery of goods. When a user receives a delivery of items, the subject matter disclosed herein can sense when a user has received and/or opened a delivery container, which, in turn can be used to initiate or execute an application on the user's device. The application can initiate a live connection with a customer service representative and/or provide access to digital self-help material and content associated with the delivered items. In some implementations, the application can collect behavioral information associated with the customer and transmit this information to one or more backend systems via the communications network. Because the application can be executed on a user's mobile device or on an interactive computing device provided with the delivery, for example, the user can obtain customer support without requiring him/her to travel to a physical storefront.

Figure 1:
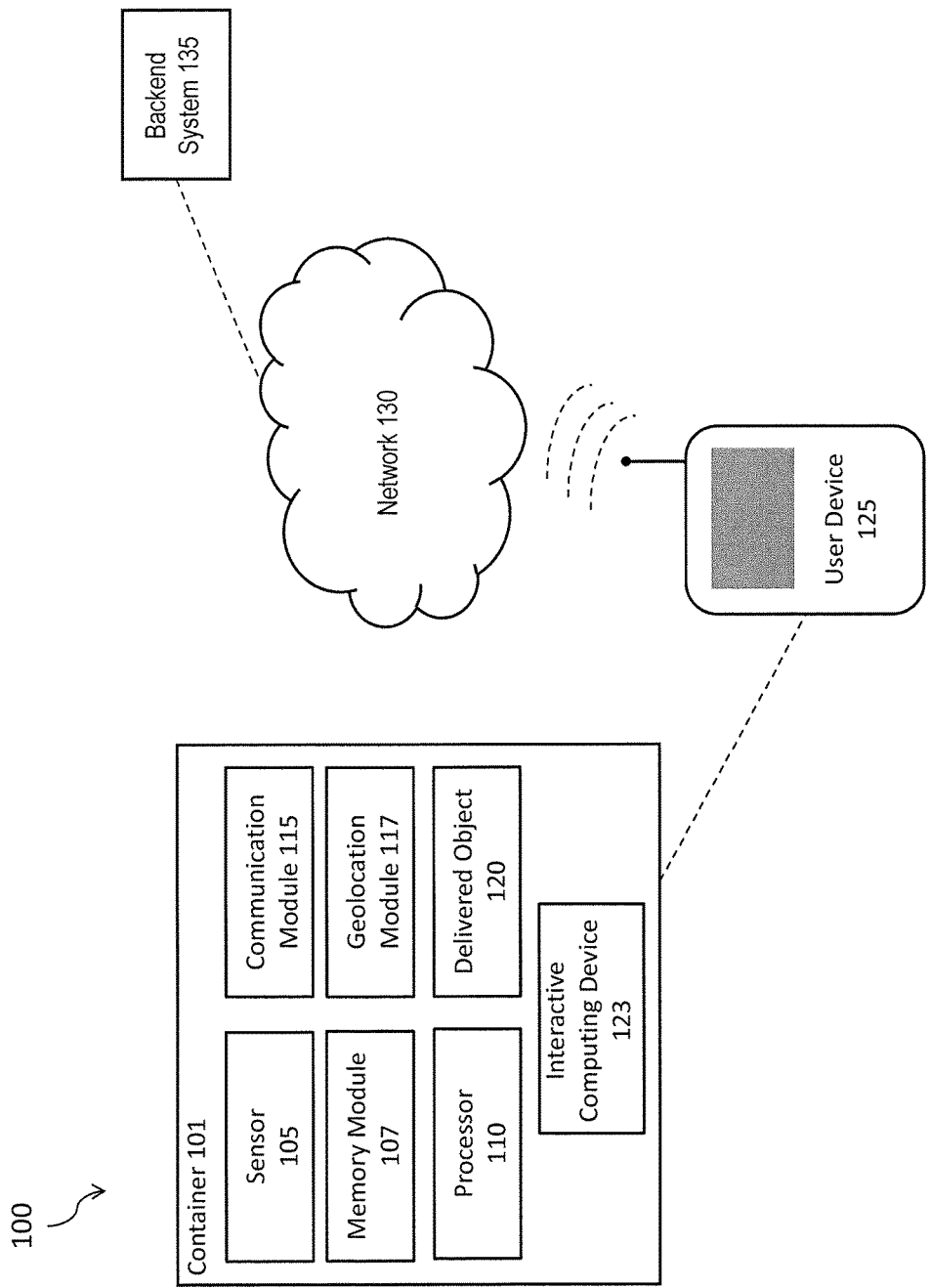
FIG. 1 illustrates a system architecture for using a customer service application in accordance with some example implementations.

FIG. 1 illustrates a system 100 for implementing the techniques disclosed herein. System 100 can include a container 101 housing one or more devices or objects 120, which can include, without limitation, apparel, accessories, consumer goods such as electronics, automotive parts, industrial equipment or parts thereof, or any other device or object that can be delivered via container 101. A user can, for example, purchase, request, or order device or object 120 from a retailer, and the retailer can deliver the device to the user in container 101. Container 101 includes a processor 110 that is communicatively coupled to a sensor 105. Container 101 may further include a memory module 107, a communication module 115, and a geolocation module 117.

Sensor 105 can be configured to detect when container 101 is opened. In some implementations, sensor 105 can be embedded within container 101. Sensor 105 can, for example, be integrally formed within an inside surface of container 101, such as embedded in a lid or a supporting wall. In some implementations, sensor 105 can be mounted to an inside surface of container 101. Sensor 105 can be an ambient light sensor, a motion sensor, and the like. When sensor 105 detects that container 101 has been opened, it can generate and send a signal indicating the same to processor 110.

Upon receiving this signal from sensor 105, processor 110 can send an activation signal to communication module 115. In some implementations, communication module 115 can be a transceiver or transmitter device operatively connected to backend system 135 via a wireless connection or a wired connection, for example. The wireless connection can be a WiFi connection, a global WiFi connection, a radio frequency connection, a connection via a SIGFOX network, a connection via a satellite network, a cellular connection, a Bluetooth connection, and the like. In some implementations, the wireless connection can traverse network 130. Optionally, network 130 can include a gateway, such as a GSM gateway, that routes traffic to backend system 135.

Receiving the activation signal can turn the communication module on or awaken it from a quiescent state, such as a sleep mode or hibernation mode. Once activated, communication module 115 can send a signal to backend system 135 using one or more of the wireless and wired connections described above. In some implementations, communication module 115 may already be on or in an awakened state when it receives the activation signal from processor 110. In these implementations, receipt of the activation signal merely causes communication module 115 to transmit a signal to backend system 135. Communication module 115 can be configured to transmit this signal once, on a periodic basis (e.g., once every 30 seconds, once every 1 minute, and the like) or on a continuous basis until receipt is acknowledged by backend system 135. In some implementations, communication module 115 can be configured to send this signal any time a customer interacts with devices or objects 120, for example. Doing so can facilitate the collection of data representative of customer behavior.

In some implementations, the signal transmitted by communication module 115 to backend system 135 can include information regarding the shipping container, the container's contents, the designated recipient, the time at which the container was opened, the location or address at which the container is opened, data representative of the customer's environment, and any combination thereof. This information can be stored in a profile at memory module 107. In some implementations, some or all of the information described above may already be stored at backend system 135. In these implementations, it may not be necessary to include this information in the signal transmitted by communication module 115. Memory module 107 can be a computer data storage device, such as random access memory, electrically erasable programmable read-only memory, and the like. FIG. 2 illustrates an exemplary profile 200 that includes container information 205, container contents information 240, and customer information 280. Communication module 115 can transmit none, some, or all of the information in profile 200 to backend system 135. In the implementation of FIG. 2, a single profile 200 can store all three types of information. However, other variations are possible including, for example, the use of a separate profile for each type of information.

Container information 205 can include a container ID 210 that uniquely identifies container 101, the container's battery power level 215, a container return address 220, and a container opening address 220. Container 101 can have a battery that supplies power to one or more of memory module 107, sensor 105, processor 110, communication module 115, and geolocation module 117. Battery power level 215 can represent the battery's current power level, the percentage of remaining battery power remaining, an estimated time at which the battery will be completely depleted, and the like. Container return address 220 can represent an address at which object 120 and/or container 101 can be returned. Container opening address 223 can correspond to the location at which container 101 is opened. Geolocation module 117 can determine and save container opening address 223 to memory module 107 when container 101 is opened.

Container contents information 240 can include information representative of the objects or devices 120 shipped in container 101. This information can include a product description 245 (e.g., a DVD recorder), a product identifier 250 (e.g., a serial number of the DVD recorder), and a quantity 255 of each object 120 in container 101 (e.g., 2 DVD recorders). Container contents information 240 can also include retailer information that identifies the retailer from which object 120 was purchased and/or sent. This information can include the retailer's name 260 and the retailer's network address 265, for example. The retailer's network address 265 can include a uniform resource locator (URL) associated with the retailer, an IP address associated with the retailer, and the like.

Customer information 280 can include information regarding the designated recipient. This information can include the customer's name 283 and the customer's physical delivery address 285, for example.

Returning to FIG. 1, backend system 135 can store one or more customer records associated with the delivery of objects 120 using container 101. In some implementations, backend system 135 can include a backend processor and can be a customer relationship management (CRM) system, for example. These customer records can include information regarding the container used for the delivery, such as container ID 205, as well as information for contacting the customer via user device 125, for example. User device 125 can be configured to execute a customer service application to simulate a customer service experience. User device 125 can be a computing device, such as a cellular phone, a laptop computer, a tablet computer, a desktop computer, a portable media player, and the like. Each customer record can store an identifier associated with user device 125, such as a serial number, an IP address, a MAC address, a device nickname, and the like.

Upon receiving the signal or message transmitted from communication module 115, backend system 135 can search its customer records until it finds the customer record associated with the received message. Backend system 135 can conduct this search using, for example, container ID 205. Upon retrieving the desired customer record, backend system 135 can send a message to the customer's user device 125 using the user device identifier. This message can include any of the information associated with profile 200 and/or the customer record and can be sent as one or more of a text message, a voice call, an e-mail, a notification, and the like. In some implementations, communication module 115 can send any of the information associated with profile 200 directly to user device 125 and/or interactive computing device 123.

Upon receiving the message from backend system 135, user device 125 can display a notification, such as notification 300 illustrated in FIG. 3. Notification 300 can thank the customer for his/her purchase and can include personalized information, such as the customer's name, a description of the products purchased, and the like. This personalized information can be extracted from the profile information sent to user device 125 from backend system 135 and/or communication module 115. Notification 300 can prompt the customer to launch a customer service application by selecting, tapping, or otherwise manipulating object 305. In the implementation of FIG. 3, object 305 can be a slider, although any graphical user interface object can be used. Dragging the slider can cause user device 125 to execute a customer service application installed on the user device. If, however, the customer service application is not already installed on user device 125, manipulating object 305 can prompt the user device to obtain the application. For example, if the customer service application is not installed on user device 125, the user device can execute a web browser on the device and navigate the browser to the retailer's network address to download the application via network 130 from an application store or the like. This network address can correspond to retailer network address 265 in profile 200, which can be transmitted with the profile to user device 125.

Referring to FIG. 1, the customer service application running on user device 125 can be operatively connected to backend system 135 via network 130. When the customer service application is executed or launched on user device 125, the application can initiate a connection with backend system 135. This connection can facilitate interaction between the customer and a live customer service representative or provide access to various resources, such as an automated CRM process. The customer service application can guide the customer through a home try on, ask the customer if he/she is satisfied with the delivered items, launch a survey, educate the customer on the contents of the container, schedule a pick-up and/or return of the contents, collect data regarding how many times the container was opened and create and send reports regarding the same to protect against fraudulent claims that a customer has not received an item, and the like.

While the disclosure herein describes operation of the customer service application with respect to user device 125, other devices can be used as a substitute for or in combination with the user device. For example, interactive computing device 123 included in container 101 can execute the customer service application. Interactive computing device 123 can be, for example, a cellular phone, a tablet computer, and the like and can be communicatively coupled with one or more of user device 125, network 130, and backend system 135. When processor 110 receives a signal from sensor 105 indicating that container 101 has been opened, the processor can trigger communication module 115 to send a signal to interactive computing device 123 to turn the interactive computing device on or to awaken it from a quiescent state. Interactive computing device 123 can launch the customer service application and access the information stored in profile 200. In some implementations, the information in profile 200 can be locally stored on interactive computing device 123.

Figure 4B:
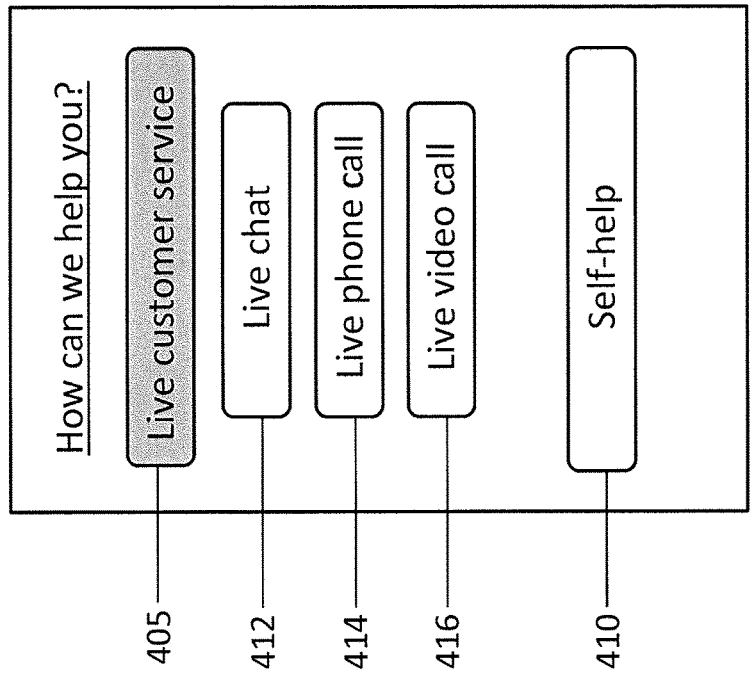
FIGS. 4A, 4B, and 4C illustrate graphical user interface for operating a customer service application.
Figure 4A:
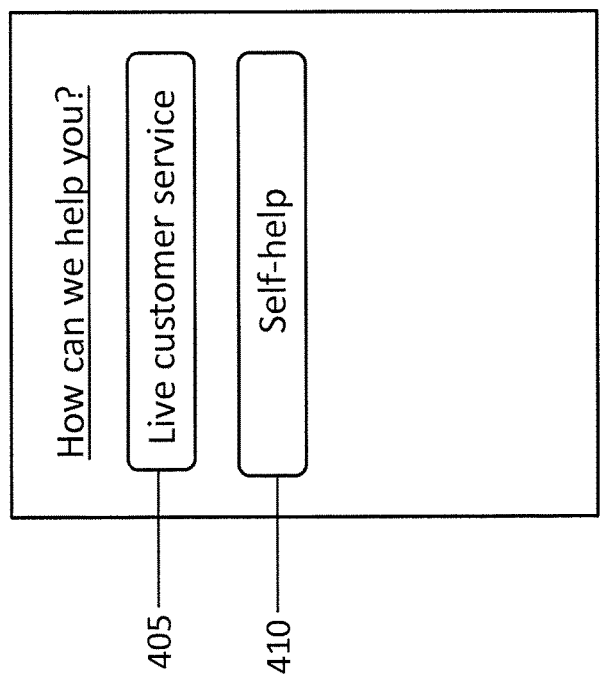

FIG. 4A illustrates a home screen 400 of the customer service application. Home screen 400 can include various customer service interaction options. A customer can initiate a live customer service experience by selecting object 405. In implementations where the interactive computing device 123 is being used, the interactive computing device can have a physical button that, when pressed, provides live support. The live interaction option is described below with respect to FIGS. 4B, 4C, and 4D. If, however, the customer prefers to work without live assistance, he/she can select object 410 to access digital self-help resources. The self-help option is described below with respect to FIG. 4E.

When live support is desired and object 405 is selected, the customer service application can display graphical user interface 415 illustrated in FIG. 4B. The customer service application can support various types of live interaction including, for example, live chat 412, a live phone call 414, a live video call 416, and the like. The user can select the desired type of interaction by selecting, tapping, or otherwise manipulating objects 412, 414, and 416. In some implementations, the customer service application may render any of objects 412, 414, and 416 inaccessible if a particular type of communication is not supported by user device 125 or interactive computing device 123. For example, if user device 125 lacks a video camera, then live video call 416 may be grayed out or removed from graphical user interface 415. In this scenario, the customer can user interactive computing device 123 to initiate live video call 416.

Figure 4C:
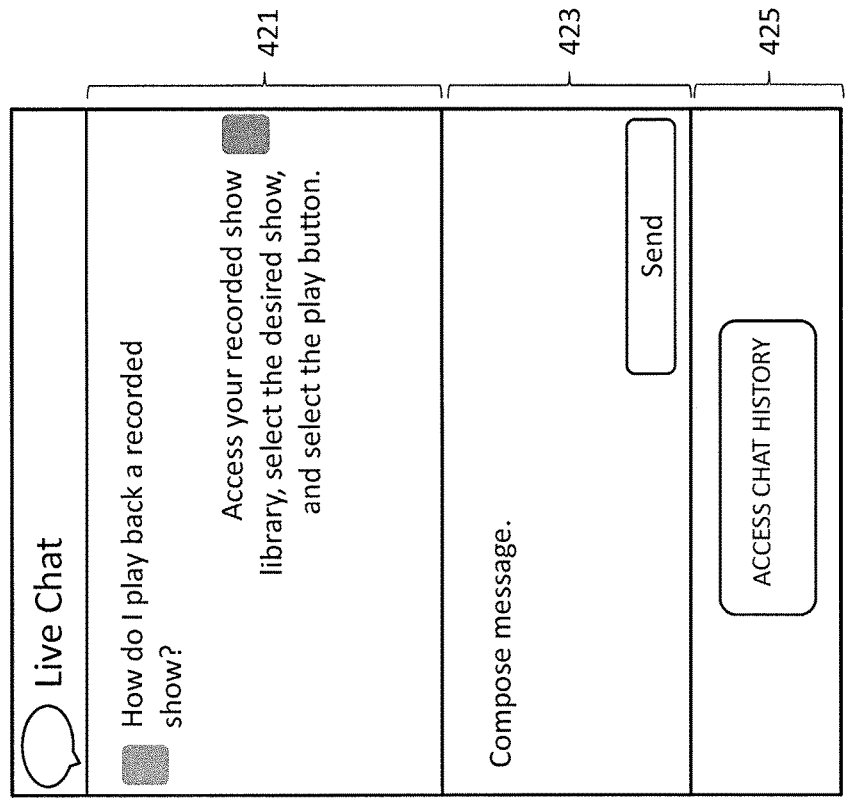

When live chat 412 is selected from FIG. 4B, the customer service application can display chat window 420 illustrated in FIG. 4C. Live chat can be supported by the customer service application or by a native application residing on mobile device 125 or interactive computing device 123. The native application can be a text message application, for example. Chat window 420 can include a chat thread 421. Chat thread 421 can include messages exchanged between the customer and a customer service representative during the current interaction. In some implementations, chat window 420 can provide access to chat threads from previous interactions. These prior chat threads can be accessed by selecting, clicking, or otherwise manipulating the "Access Chat History" object 425. A customer may be able to search these prior chat threads by customer service representative name, product identifier or serial number, key word, and the like. Providing access to prior chat threads can be useful if, for example, a customer seeks help from different customer service representatives regarding the same item. Chat thread 421 and prior chat threads can be saved locally on user device 125, remotely at backend system 135, or both. The customer can use input message box 423 to compose and send messages to the customer service representative.

Figure 4D:
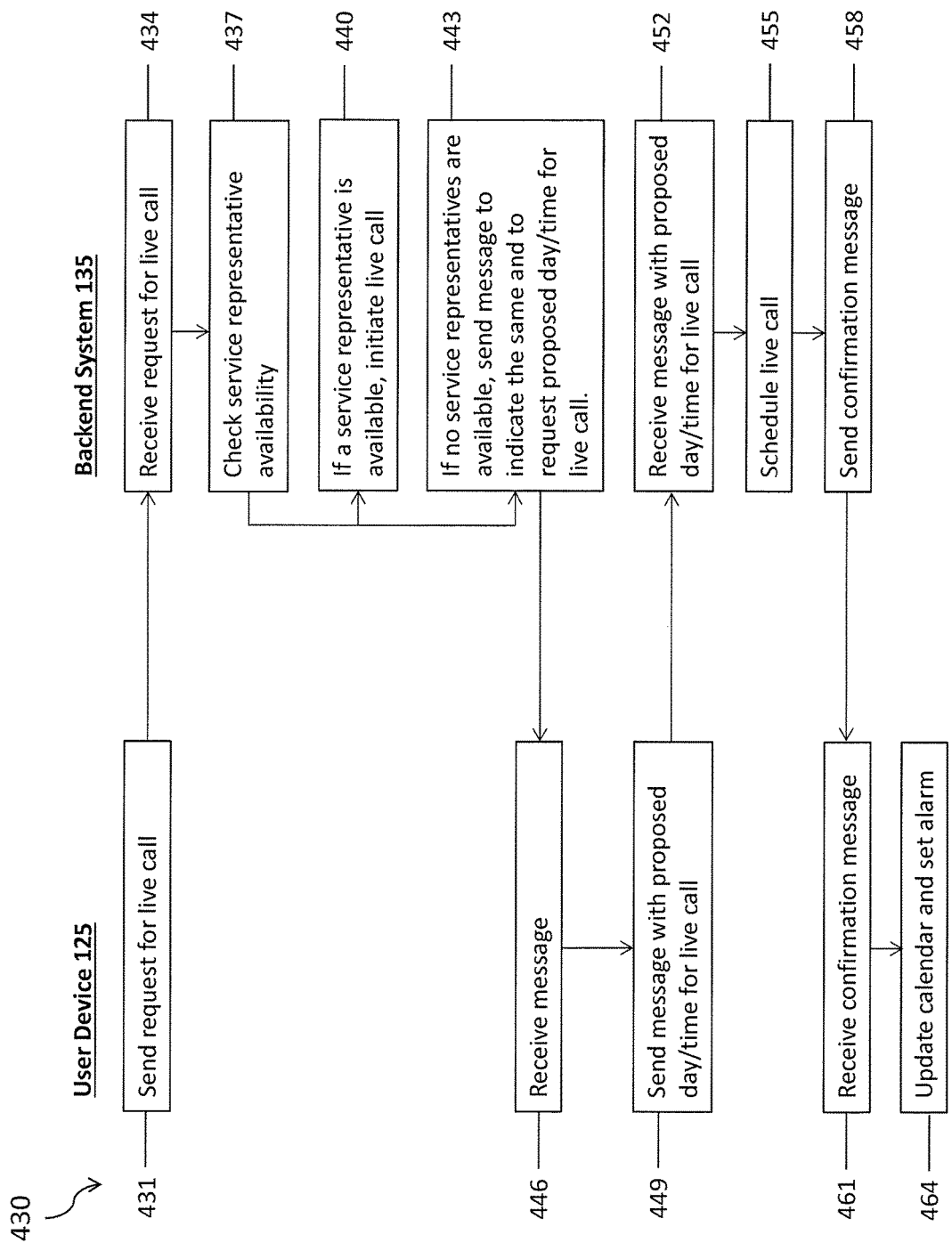
FIG. 4D illustrates a flowchart for initiating a live phone call in accordance with some example implementations.

When live phone call 414 is selected from FIG. 4B, the customer service application can use flowchart 430 illustrated in FIG. 4D to initiate the phone call. While the implementation of FIG. 4D illustrates the exchange of messages between user device 125 and backend system 135, other variations are possible. For example, interactive computing device 123 hosting and/or executing the application can replace user device 125. In some implementations, information can be exchanged between user device 125, interactive computing device 123, and backend system 135.

At 431, user device 125 can send a request for live interaction with a customer service representative to backend system 135 via network 130. This request can specify the desired interaction (e.g., a live phone call) and the means for interaction (e.g., a phone number at which user device 125 can be reached). Backend system 135 can receive this request at 434. At 437, backend system 135 can determine whether there are any customer service representatives currently available for the desired interaction. Backend system 135 can make this determination by accessing the work schedules of various customer service representatives and determining whether any of these representatives are accepting calls. If a customer service representative is available, then the backend system 135 can transmit the customer's information to the selected representative, and the selected representative can call the customer at 440.

If, however, backend system 135 determines at 437 that there are no customer service representatives available for a live phone call, then the backend system can send a message indicating the same to user device 125 at 443. This message can also request the customer to provide a day and time for scheduling a call in the future. User device 125 can receive this message at 446. User device 125 can send a message including a proposed day and time at 449, and backend system 135 can receive this message at 452. At 455, backend system 135 can schedule the call. In order to do so, backend system 135 can refer to the work schedules of customer service representatives and select a representative based on his/her availability at the proposed day and time. After scheduling the call, backend system 135 can send a confirmation message at 458 with the scheduled day and time to user device 125. User device 125 can receive this confirmation message at 461. At 464, the customer service application can update a calendar application or alarm application on user device 125 to include the scheduled live call.

When live video call 416 is selected from FIG. 4B, the customer service application can initiate a live video call with a customer service representative, via network 130. The live video call can be supported by the customer service application or by a native application residing on mobile device 125. Different native applications can be used for the live video call including, for example, FaceTime®, Skype®, and the like. The customer service application can initiate the live video call in a similar manner as the live phone call using process 430. Minor adjustments apparent to a person of ordinary skill in the art can be made to process 430 in order to accommodate a live video call instead of a live phone call.

Figure 4E:
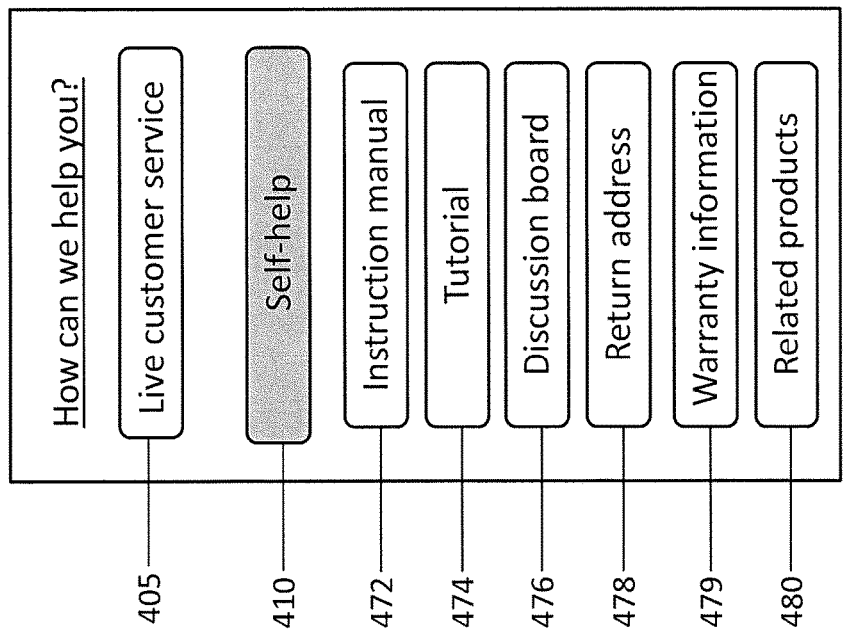
FIG. 4E illustrates a graphical user interface for operating a customer service application in accordance with some example implementations.

Referring to FIG. 4A, self-help object 410 can be selected if the user prefers help without live assistance. When self-help object 410 is selected, the customer service application can generate and display graphical user interface 470 as illustrated in FIG. 4E on one or more of user device 125 and interactive computing device 123. Graphical user interface 470 can display various digital resources for obtaining information relating to objects 120 in container 101. Each resource is described below.

When instruction manual 472 is selected from graphical user interface 470, the customer service application can display one or more instruction manuals for object 120 in container 101. These instruction manuals can be locally saved to a digital memory associated with user device 125 or interactive computing device 123, or remotely accessed from backend system 135. When remotely accessing the instruction manual, the customer service application can send a request for the same to backend system 135. In order to retrieve the correct instruction manual, this request can include a description of the object 120 in container 101. As described above with respect to FIG. 2, a description of object 120 can be found in profile 200 which may be saved to user device 125 or interactive computing device 123. This description can include the object's product description 245, the object's product identifier 250, and the like. Backend system 135 can use this description to find the requested instruction manual and send the same to user device 125. When the desired instruction manual is accessed or retrieved (either remotely from backend system 135 or from a local storage device on user device 125 or interactive computing device 123), the customer service application can display the instruction manual on the user device. The customer service application can provide search options that allow a user to search for specific topics and issues in the instruction manual.

When tutorial 474 is selected from graphical user interface 470, the customer service application can display one or more tutorials for object 120. These tutorials can lead a user through various features of object 120. Different types of tutorials can be used including, for example, a hands on interactive tutorial that responds to user input, a video tutorial, a presentation, and the like. These tutorials can be locally saved to user device 125 or interactive computing device 123. In some implementations, the customer service application can remotely access tutorials from backend system 135 in a similar manner as the process described above with respect to instruction manuals. When the desired tutorial is accessed or retrieved (either remotely from backend system 135 or from a local storage device on user device 125 or interactive computing device 123), the customer service application can display the tutorial on the user device.

When discussion board 476 is selected from graphical user interface 470, the customer service application can display a discussion board relating to object 120. This discussion board can be an online bulletin board, for example. Users can ask and reply to questions, provide comments, post pictures and/or videos, provide links to reviews, and the like using the discussion board. The content in the discussion board may be remotely accessed from backend network 135. In some implementations, the discussion board may be hosted at a particular website. In these implementations, the customer service application can launch an Internet browser on user device 125 or interactive computing device 123 and navigate the browser to the website address. The website address associated with the discussion board can correspond to retailer network address 265 stored in profile 200, for example.

When return address 478 is selected from graphical user interface 470, the customer service application can display one or more addresses at which object 120 and/or container 101 can be returned or exchanged. Providing this information can encourage the customer to return container 101. In some implementations, one or more of processor 110 and backend system 135 can send a reminder message to user device 125 or interactive computing device 123 to return the container. Providing this information can also be helpful if a customer is unhappy with object 120 and wishes to return the object for a refund or exchange the object for a different item. In some implementations the customer service application can display the return policy or exchange policy for object 120 when return address 478 is selected. These return addresses can be locally stored at user device 125 or interactive computing device 123. As described above with respect to FIG. 2, the return address can correspond to container return address 220 in profile 200 which can be saved to user device 125 or interactive computing device 123. In some implementations, the customer service application can remotely access return addresses from backend system 135. In addition to displaying the return address, the customer service application can optionally display addresses of nearby shipping companies. The customer can use this information to manually return object 120 and/or container 101. Additionally or alternatively, the customer service application can automatically schedule a pickup of object 120 and/or container 101 upon receiving a selection of a shipping company and a proposed pickup date/time from the customer. In these implementations, the customer service application can automatically transmit the return address to the shipping company when the pickup appointment is made. Additionally or alternatively, when return address 478 is selected, the customer service application can automatically schedule a pickup of object 120 and/or container 101.

In order to retrieve return addresses near the customer, the customer service application can send a request to the backend system 135 that includes the retailer's name and the customer's current location. The retailer's name can be stored in profile 200 which can be saved to user device 125. User device 125 can determine the customer's current location using a geolocation module. Additionally or alternatively, interactive computing device 123 can determine the customer's location using geolocation module 117. Backend system 135 can use this information to search for store locations affiliated with the retailer that are in geographic proximity to the customer. Backend system 135 can find, for example, a number of stores nearest to the customer's current location and send addresses of these stores to user device 125 or interactive computing device 123. In some implementations, user device 125 or interactive computing device 123 can search for directions to these return addresses and display the directions to each address.

When warranty information 479 is selected from graphical user interface 470, the customer service application can display the warranty information for object 120. Providing this information can be helpful if, for example, repairs are needed to object 120, and a customer wants to determine whether these repairs are covered under the warranty. Warranty information can be stored locally at user device 125 or interactive computing device 123 or accessed remotely from backend system 135. In order to remotely access the warranty information from backend system 135, the customer service application can send a request to the backend system 135 that includes a description of object 120. This description can be stored in profile 200, for example, and can correspond to a product description 245, a product identifier 250, and the like. Backend system 135 can use this description to find the requested warranty information and send the same to user device 125 or interactive computing device 123. In some implementations, the warranty information can include the address of one or more repair facilities. The customer service application can display directions to these repair facilities along with the warranty information.

When related products 480 is selected from graphical user interface 470, the customer service application can display related products that can be used with or as a substitute for object 120. These related products can include, for example, accessories for object 120, products similar to the object, and the like. For example, if object 120 is a tennis racquet, then related products can include tennis balls, a carrying case for the tennis racquet, a net for a tennis court, other tennis racquets, and the like. The customer service application can generate a list of related products by searching the Internet using a web browser. For example, the customer service application can launch a web browser on user device 125 or interactive computing device 123, navigate the browser to a search engine, and provide object 120 or product description 245 as keywords for the search. Additionally or alternatively, backend system 135 can provide a list of related products to user device 125 or interactive computing device 123. The backend system 135 can compile this list by referring to historical purchase records. These historical purchase records can, for example, provide a list of items that are commonly purchased with object 120. Continuing with the tennis racquet example described above, if tennis shoes are commonly purchased with a tennis racquet, then backend system 135 can designate tennis shoes as a related product. Backend system 135 can prioritize related products by frequency (i.e., determine which items are most commonly purchased with a particular object) and send a subset or all of these related products (e.g., send the top five related products) to user device 125 or interactive computing device 123. In some implementations, the customer service application can filter the related products by retailer before displaying them on user device 125 or interactive computing device 123. Filtering and presenting related products sold by a specific retailer can boost sales for the retailer. Other variations are possible including, for example, displaying related products from a particular retailer before displaying related products from other retailers.

In some implementations, the container 101 and the various electronic modules residing within the container can collect data associated with the customer service experience. Different types of data can be collected including, for example, customer behavior data describing the customer's interaction with container 101 and/or the customer service application. This data can provide valuable information for future upgrades to container 101 and/or the customer service application and marketing data regarding how object 120 is used. For example, frequently opening and closing container 101 can repeatedly turn sensor 105, processor 110, and communication module 115 on and off. Doing so can drain the power source (e.g., a battery) that supplies power to these electronic modules. This power source can be embedded in container 101. In some implementations, processor 110 can be configured to count the number of times container 101 is opened, how much power is depleted during each opening (e.g., by measuring battery power before and after the container is opened), and save this information to battery power level 215 in profile 200. Processor 110 can update the value associated with battery power level 215 each time container 101 is opened. Communication module 115 can transmit the battery power level to interactive computing device 123 or user device 125 in profile 200 or in a separate message. Interactive computing device 123 or user device 125 can send the value associated with battery power level 215 to backend system 135 which, in turn, can use this value to calculate the average battery life. In some implementations, interactive computing device 123 or user device 125 can perform this calculation and send the determined average battery life to backend system 135. This information can be helpful in understanding how frequently the power source in container 101 should be replaced.

In some implementations, container 101 and/or the customer service application can collect data describing how the container and object 120 are used. Container 101 can include an image capture device, such as a camera, operatively connected to one or more of sensor 105, processor 110, and communication module 115. The image capture device can be integrated within container 101 (e.g., embedded within the inner bottom surface of the container) or within interactive computing device 123. The image capture device can be configured to take one or more images of the customer's environment and object 120 after container 101 is opened. For example, when processor 110 receives a signal from sensor 105 indicating that container 101 has been opened, the processor can instruct the image capture device to take one or more images. Communication module 115 can send these images to user device 125 which, in turn, can transmit these images to backend system 135. Additionally or alternatively, interactive computing device 123 can send these images to backend system 135. Backend system 135 can use these images to determine, for example, the setting in which the container is opened (e.g., indoors or outdoors), how object 120 is used (e.g., whether the customer is trying on the object or physically comparing it to nearby items), and the like. These images can be used in various ways. For example, if the customer is using container 101 outdoors at a swimming pool, the customer service application can supplement the list of related products 480 with swimming products. In another example, if a customer receives a dress in container 101 and begins comparing the dress to items in her closet, a customer service representative can use these images to suggest items that can be worn with the dress during a live phone call.

The customer service application can also collect data associated with the customer service experience. For example, the customer service application can log the number of times the application is launched or activated on user device 125 or interactive computing device 123, when the application is launched, how long each session lasts, how often live assistance is requested, what type of live assistance is most often requested (e.g., live chat, live phone call, or live video call), how often self-help is requested, what type of self-help is most often requested (e.g., access to instructional manuals, tutorial, discussion boards, return addresses, warranty information, or related products), and the like. In some implementations, the customer service application can collect data regarding the level of customer activity with container 101 including, for example, whether the container is opened at all. Sensor 105 can be configured to send a signal or message to processor 110 upon detecting that container 101 has not been opened during a predetermined period of time (e.g., 10 days). Upon receiving this signal or message, processor 110 can prompt communication module 115 to send a notification to user device 125 or interactive computing device 123 to remind the customer of the delivery and ask the customer whether he/she needs assistance. The customer service application can transmit any combination of the information described above to backend system 135. Backend system 135 can collect this data from multiple user devices and perform analytics on this data to determine patterns of customer behavior.

Collecting information regarding the customer service experience can also be useful for big data analytics which, in turn, can help identify marketing opportunities for retailers. For example, obtaining information regarding returned products can help a retailer understand where its products are being used, which models are unpopular, and the like. The customer service application can collect this information when return address 478 is selected and transmit this information to backend system 135 for further analysis. The collected information can include product description 245, delivery address 285, and the like. For example, if a retailer receives thousands of returns of sunglasses (i.e., the product description) from users in Region A (i.e., the delivery address) and a negligible number of returns from users in Region B, then the retailer can use this information to reduce inventory in Region A and increase its marketing efforts in Region B. All of this information can be collected based on the user's interaction with the customer service application.

In some implementations, the customer service application can provide protection against fraudulent claims that a customer did not receive container 101. As described above with respect to FIGS. 1 and 2, container 101 can include a geolocation module 117 that can determine the location (e.g., an address) at which the container is opened. This location can be saved as the container opening address 223 in profile 200, and this information can be transmitted to user device 125 or interactive computing device 123. If a customer claims that he/she did not receive container 101, the customer service application and/or backend system 135 can compare container opening address 223 with physical delivery address 285. If these addresses do not match, then container 101 may have been delivered to the incorrect address, and the customer may not have received container 101. If, however, container opening address 223 matches physical delivery address 285, then the customer may, in fact, have received and opened container 101 and the customer's claim may be fraudulent. In some implementations, backend system 135 can generate reports for insurance companies including the information described above to combat these fraudulent claims.

The customer service application can also protect retailers from fraudulent chargebacks. In a retail transaction, a customer can purchase an object or item (such as delivered object 120) from a retailer using a payment card. If the customer is unhappy with the purchased item, he/she may return the item and initiate a chargeback with the payment card issuing bank to obtain a refund. The issuing bank can, in turn, request the returned funds from the retailer. In some situations, however, a customer may receive the refund without actually returning the item. In order to prevent fraudulent chargebacks from occurring, the customer service application may determine, for example, the current location of delivered object 120 using the current location of container 101. This location may be determined using geolocation module 117 or interactive computing device 123, for example. Communication module 115 can send this location information to user device 125 which, in turn, can relay this information to backend system 135 using the customer service application. If the location information indicates that the container and its contents are still with the customer, then backend system 135 can conclude that a fraudulent chargeback has occurred and alert the retailer of the same. In order to help the retailer dispute the chargeback, backend system 135 can generate one or more reports detailing the container's history (e.g., the container's daily location, how often the container was opened and/or closed, and the like).

Figure 5:
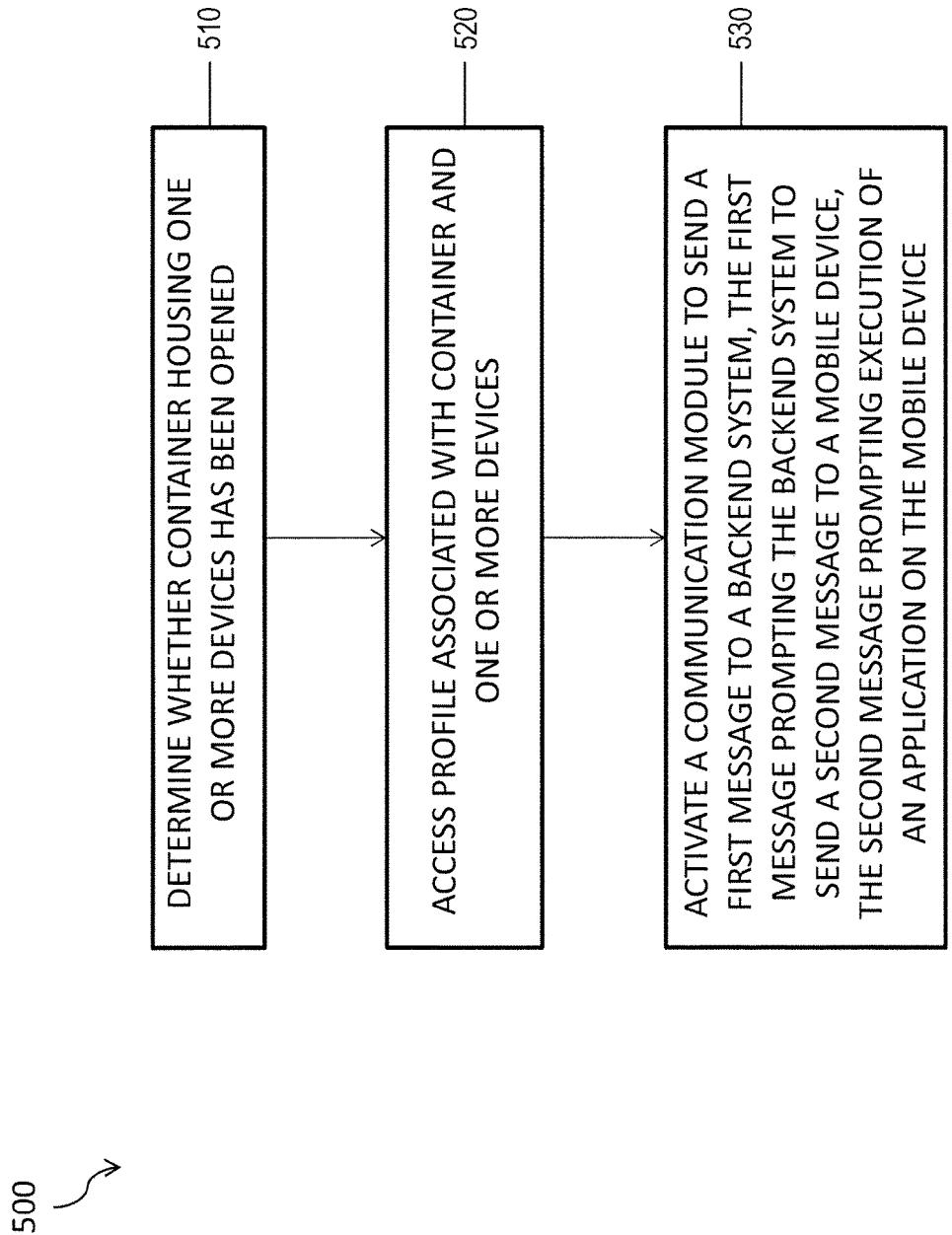
FIG. 5 illustrates a flowchart for prompting execution of a customer service application in accordance with some example implementations.

FIG. 5 illustrates a flowchart 500 for prompting execution of a customer service application consistent with the subject matter disclosed herein.

At 510, a processor in a container can determine whether the container has been opened. In the implementation of FIG. 1, for example, processor 110 can receive an indication that container 101 has been opened from sensor 105.

At 520, the processor can access a profile associate with the container and one or more devices. This accessing can be based on the determining performed at 510. In some implementations, the profile can be accessed upon receiving an indication from a sensor operatively connected to the processor that the container is opened. The profile can, for example, correspond to profile 200 stored in memory module 107. This profile can include a first value that uniquely identifies the container, such as container ID 210. This profile can also include a second value representative of the devices or objects 120 shipped in container 101. This second value can correspond to product identifier 250, for example.

At 530, the processor can activate a communication module to send a first message to a backend system. In the implementation of FIG. 1, for example, processor 110 can activate or awaken communication module 115 which, in turn, can send the first message to backend system 135. The first message can include at least some of the accessed profile, such as container ID 210, for example. Upon receiving this first message, backend system 135 can search its customer records to find the customer record associated with container ID 210. This customer record can include contact information for contacting a user device associated with the customer. The backend system can send a second message to user device 125 using this contact information. This second message can prompt execution of an application on the mobile device. The application can be configured to provide a customer service interaction session with the customer relationship management system associated with the backend system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    determining, by a sensor contained within a container configured to house one or more objects, whether the container housing the one or more objects has been opened;
    accessing, by a processor connected with the sensor and based on determining that the container has been opened, a profile associated with the container and the one or more objects, the profile including at least a first value uniquely identifying the container, container contents information about the one or more objects, and customer information about a designated recipient of the container; and
    activating, by the processor based on determining that the container has been opened, a communication module integrated with the container to send a first message via a communication network to a backend system, the first message including at least some of the accessed profile, the backend system comprising at least one backend processor and associated with a customer relationship management system, the first message prompting the backend system to search for a customer record using the first value and the customer information, and to send a second message to a mobile device associated with the customer record, the second message prompting execution of an application on the mobile device, the application being configured to provide a customer service interaction session for the designated recipient of the container with the customer relationship management system associated with the backend system, the customer service interaction session comprising a live connection with a customer service representative and digital content served from the backend system.

2. The computer-implemented method of claim 1, wherein the communication module sends the first message to the backend system using one or more of a wireless connection and a wired connection.

3. The computer-implemented method of claim 2, wherein the wireless connection is one or more of a WiFi connection, a global WiFi connection, a radio frequency connection, a connection via a SIGFOX network, a connection via a satellite network, a cellular connection, and a Bluetooth connection.

4. The computer-implemented method of claim 1, wherein the second message is one or more of a text message, a voice call, an e-mail, and a notification.

5. The computer-implemented method of claim 1, wherein the profile further includes a second value, the second value associated with one or more identifiers that uniquely identify each of the one or more objects.

6. The computer-implemented method of claim 1, wherein the application is configured to provide access to self-help material.

7. The computer-implemented method of claim 6, wherein the self-help material includes one or more of an instruction manual associated with the one or more objects, a tutorial associated with the one or more objects, a discussion board associated with the one or more objects, a return address associated with the one or more objects, and warranty information associated with the one or more objects.

8. The computer-implemented method of claim 1, wherein the application is configured to provide access to information describing one or more related products used with the one or more objects.

9. The computer-implemented method of claim 1, wherein the determining further comprises receiving a signal from the sensor in the container, the signal indicating that the container has been opened.

10. The computer-implemented method of claim 9, wherein the sensor is one or more of an ambient light sensor and a motion sensor.

11. The computer-implemented method of claim 1, wherein the profile further includes an address for returning the container, and
    wherein the application is configured to cause the mobile device to display a third message, the third message including a reminder to return the container to the address.

12. A non-transitory computer-readable medium containing instructions to configure a processor to perform operations comprising:
    determining, by a sensor contained within a container configured to house one or more objects, whether the container housing the one or more objects has been opened;
    accessing, by a processor connected with the sensor and based on determining that the container has been opened, a profile associated with the container and the one or more objects, the profile including at least a first value uniquely identifying the container, container contents information about the one or more objects, and customer information about a designated recipient of the container; and
    activating, by the processor based on determining that the container has been opened, a communication module integrated with the container to send a first message via a communication network to a backend system, the first message including at least some of the accessed profile, the backend system comprising at least one backend processor and associated with a customer relationship management system, the first message prompting the backend system to search for a customer record using the first value and the customer information, and to send a second message to a mobile device associated with the customer record, the second message prompting execution of an application on the mobile device, the application being configured to provide a customer service interaction session for the designated recipient of the container with the customer relationship management system associated with the backend system, the customer service interaction session comprising a live connection with a customer service representative and digital content served from the backend system.

13. The non-transitory computer-readable medium of claim 12, wherein the communication module sends the first message to the backend system using one or more of a wireless connection and a wired connection.

14. The non-transitory computer-readable medium of claim 12, wherein the application is configured to provide one or more of live support with a customer service representative and access to self-help material.

15. The non-transitory computer-readable medium of claim 12, wherein the determining further comprises receiving a signal from the sensor in the container, the signal indicating that the container has been opened.

16. A system comprising:
at least one processor; and
at least one memory, wherein the at least one processor and the at least one memory are configured to perform operations comprising:
   determining, by a sensor contained within a container configured to house one or more objects, whether the container housing the one or more objects has been opened;
   accessing, by a processor connected with the sensor and based on determining that the container has been opened, a profile associated with the container and the one or more objects, the profile including at least a first value uniquely identifying the container, container contents information about the one or more objects, and customer information about a designated recipient of the container; and
   activating, by the processor based on determining that the container has been opened, a communication module integrated with the container to send a first message via a communication network to a backend system, the first message including at least some of the accessed profile, the backend system comprising at least one backend processor and associated with a customer relationship management system, the first message prompting the backend system to search for a customer record using the first value and the customer information, and to send a second message to a mobile device associated with the customer record, the second message prompting execution of an application on the mobile device, the application being configured to provide a customer service interaction session for the designated recipient of the container with the customer relationship management system associated with the backend system, the customer service interaction session comprising a live connection with a customer service representative and digital content served from the backend system.

17. The system of claim 16, wherein the communication module sends the first message to the backend system using one or more of a wireless connection and a wired connection.

18. The system of claim 16, wherein the application is configured to provide one or more of live support with a customer service representative and access to self-help material.

19. The system of claim 16, wherein the determining further comprises receiving a signal from the sensor in the container, the signal indicating that the container has been opened.

* * * * *